(No Model.)
O. BRYANT.
METHOD OF CUTTING SCREW THREADS.
No. 320,536. Patented June 23, 1885.
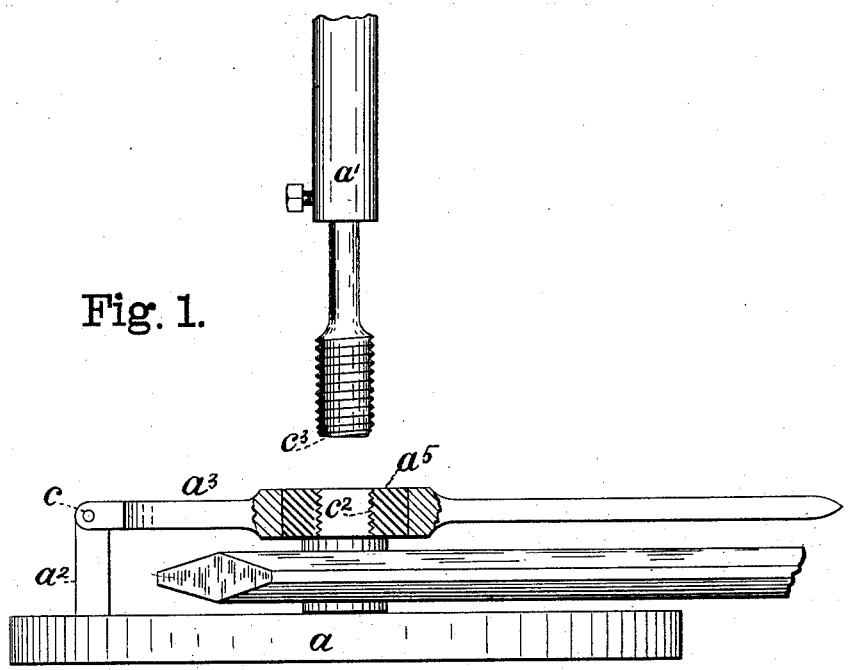
Fig. 1.
Fig. 2.
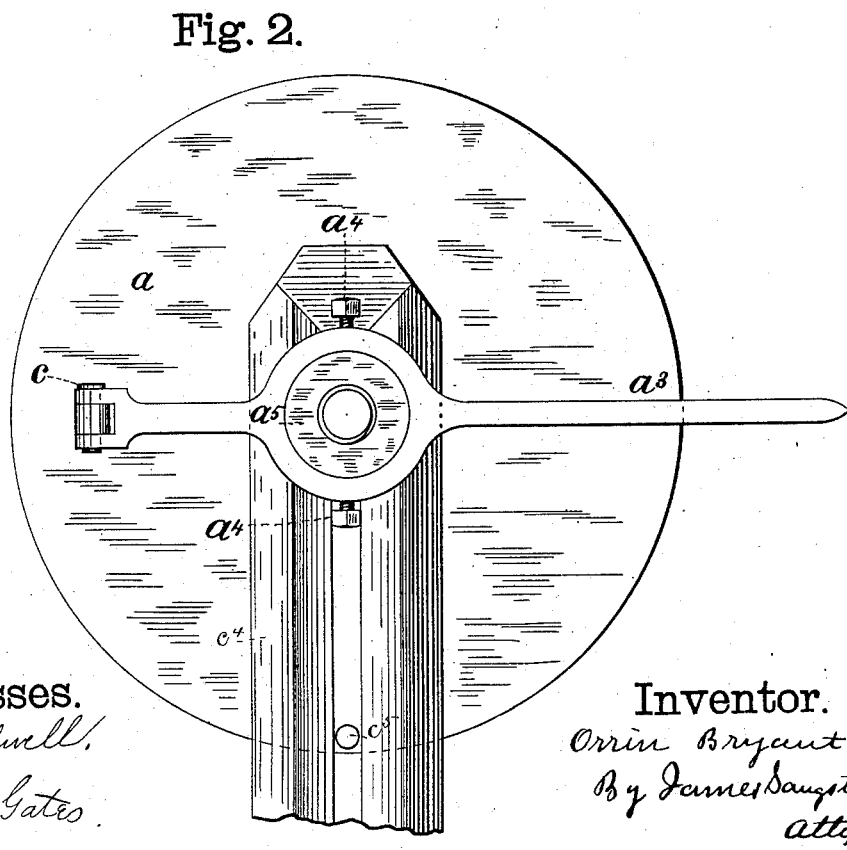
Witnesses.
J. H. Caldwell
James H. Gates
Inventor.
Orrin Bryant
By James Sangster
atty.

UNITED STATES PATENT OFFICE.

ORRIN BRYANT, OF WESTFIELD, MASSACHUSETTS, ASSIGNOR TO JOHN B. PIERCE AND JOSEPH BOND, OF BUFFALO, NEW YORK.

METHOD OF CUTTING SCREW-THREADS.

SPECIFICATION forming part of Letters Patent No. 320,536, dated June 23, 1885.

Application filed August 25, 1884. (No model.)

*To all whom it may concern:*

Be it known that I, ORRIN BRYANT, a citizen of the United States, residing in Westfield, in the county of Hampden and State of Massachusetts, have invented certain new and useful Improvements in the Mode of Cutting Screw-Threads, of which the following is a specification.

Heretofore in the manufacture of steam-radiators or other articles where a number of sections are secured together it has been found practically impossible to cut the screw-threads so that at each point the sections will come exactly together and the screw-joints be tightened alike in each section. This result I accomplish by combining with the screw-cutting tap a guide, which causes the tap to enter the opening and begin cutting the thread exactly at the same point in each and every case, whether or not the sections vary in thickness, all of which will be fully and clearly hereinafter shown by reference to the drawings, in which I have shown a suitable device for carrying out my invention, although there are many other devices with which my invention may be used.

Figure 1 represents a side elevation showing the invention partly in section, and Fig. 2 is a plan or top view.

In the same drawings, $a$ represents the bed of an ordinary upright drilling-machine; $a'$, the drill or tap stock. To the bed of the drilling-machine is secured in any well-known way a supporting arm or bar, $a^2$, to which is jointed, by a pin, $c$, the guide-lever $a^3$. In this guide-lever is secured, by bolts or set-screws $a^4$, the screw-guide $a^5$, which may be made preferably of tempered steel; or it can be made of any other suitable material. The screw-guide is a plain block, either cylindrical (or of any other form adapted to be held in a convenient holding-piece.) In the drawings it is shown as a round block, secured by set-screws $a^4$ to the guide-lever $a^3$. It is provided with a smooth screw-thread, $c^2$.

$c^3$ is an ordinary tap, the screw-thread of which corresponds with the thread in the screw-guide.

$c^4$ represents a portion of an ordinary radiator in position for having a screw cut in the opening to receive a nipple to secure it to another.

To insure the section (or other article) being put on the drill-bed or in place at the proper angle, a pin, $c^5$, on the drill-bed passes through an opening in the radiator-section. In articles not having an opening or hole through, any suitable well-known stop or guide to set it in would answer, the object being to present the article always at the same angle to the screw-cutter, so as to cut the thread exactly at the same starting-point every time. This angle, of course, may be changed by putting the stop at a different point. By this means all the sections may be cut so the screws will all tighten just the same, and all sections will come together at the same angle, which angle may be varied, as before mentioned, if desired.

I claim as my invention—

In articles to be put together in sections, the within-described mode of cutting the screw-threads, consisting in passing the tap through a guide secured in contact with the article to be cut, substantially as described.

ORRIN BRYANT.

Witnesses:
 JOSEPH BOND,
 GEORGE L. MINOR.